(12) United States Patent
Van Der Brug

(10) Patent No.: US 9,820,362 B2
(45) Date of Patent: Nov. 14, 2017

(54) LIGHTING CONTROL AND STATUS QUERIES

(71) Applicant: PHILIPS LIGHTING HOLDING B.V., Eindhoven (NL)

(72) Inventor: Willem Peter Van Der Brug, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/329,943

(22) PCT Filed: Jul. 15, 2015

(86) PCT No.: PCT/EP2015/066090
§ 371 (c)(1),
(2) Date: Jan. 27, 2017

(87) PCT Pub. No.: WO2016/015998
PCT Pub. Date: Feb. 4, 2016

(65) Prior Publication Data
US 2017/0251540 A1    Aug. 31, 2017

(30) Foreign Application Priority Data
Jul. 28, 2014   (EP) .................................... 14178695

(51) Int. Cl.
*H05B 37/02* (2006.01)
*H04L 12/863* (2013.01)

(52) U.S. Cl.
CPC ......... *H05B 37/0272* (2013.01); *H04L 47/62* (2013.01); *H05B 37/029* (2013.01); *H05B 37/0227* (2013.01)

(58) Field of Classification Search
CPC .............. H05B 37/0272; H05B 37/029; H05B 37/0227; H04L 47/62
USPC ......................................................... 315/294
See application file for complete search history.

(56) References Cited

U.S. PATENT DOCUMENTS

| 2008/0186052 A1 | 8/2008 | Needham et al. |
| 2012/0274234 A1 | 11/2012 | Campbell et al. |
| 2013/0110295 A1* | 5/2013 | Zheng .................... G05B 13/02 700/286 |

(Continued)

FOREIGN PATENT DOCUMENTS

| WO | WO0241671 A2 | 5/2002 |
| WO | WO2013095133 A1 | 6/2013 |

*Primary Examiner* — Don Le

(57) ABSTRACT

A controller comprising: a first holding location for storing or buffering two or more lighting control frames of a lighting control protocol, for transmission one-after-another in a temporal sequence over a lighting network in order to control at least one lighting device of the lighting network; and a second holding location for storing or buffering at least one status query of a device management protocol, for transmission over the lighting network in order to query a status of at least one lighting device of the lighting network. The controller further comprises an arbitrator configured to automatically detect when one of the lighting control frames is redundant with respect to another of the lighting control frames within a predetermined number of said frames in said sequence, and in response to automatically cause the status query to be transmitted in place of the redundant lighting control frame in said sequence.

15 Claims, 3 Drawing Sheets

(56) References Cited

U.S. PATENT DOCUMENTS

2013/0289750 A1 10/2013 Souvay et al.
2016/0360594 A1* 12/2016 Chemel .............. H05B 37/0227
2017/0170899 A1* 6/2017 Breuer ................ H04B 10/116

* cited by examiner

LIGHTING CONTROL AND STATUS QUERIES

CROSS-REFERENCE TO PRIOR APPLICATIONS

This application is the U.S. National Phase application under 35 U.S.C. §371 of International Application No. PCT/EP2015/066090, filed on Jul. 15, 2015, which claims the benefit of European Patent Application No. 14178695.4, filed on Jul. 28, 2014. These applications are hereby incorporated by reference herein.

TECHNICAL FIELD

The present disclosure relates to a lighting control protocol such as DMX for controlling lighting devices, and a device management protocol such as RDM or ArtRDM for querying the status of lighting devices.

BACKGROUND

DMX (Digital Multiplex) is a lighting control standard for use in applications such as theatre and concert lighting systems. It offers control of 8-bit values for 512 addresses, updated 44 times per second or faster. DMX defines support for many types of light fixtures, from simple 8-bit dimmed white lamps to RGB moving head lights with strobos and gobos.

Referring to FIGS. 1 to 3, a controller 8 transmits lighting control commands over a lighting network 7 with the commands packaged into DMX frames 26, and with the different frames being transmitted one-after-another at a different respective times in a temporal sequence. The lighting network 7 comprises one or more (slave) lighting devices 10 (shown in FIGS. 1 as $10_1$, $10_2$, and $10_N$) that are connected to the controller 8 via a suitable bus or interconnect. A DMX network 7 is sometimes referred to as a "universe". Note also that each lighting device 10 may be allocated one or more of the DMX addresses within a given system, i.e. there need not necessarily be only one address per lighting device. Thus a given device 10 may use a plurality of DMX addresses (e.g. a contiguous range of addresses in the DMX address space), for instance with a different address being assigned for controlling each of a plurality of different functions of the same device.

As shown in FIG. 2, each DMX frame 26 comprises: a start code 23 to signal the start of the frame, followed by 512 one-byte time slots 25, followed by a break period 27 to separate between adjacent frames 26 in the sequence. Each time slot 25 corresponds to a different DMX address, so that when a DMX frame is issued over the network, the byte of data in that slot is delivered to the relevant address. I.e. the position of a time slot 25 within the frame 26 determines the device and function to be controlled, while the data value of the byte in the slot specifies the control set point for that device or function. Thus a given DMX command may transmit a respective byte to up to 512 different addresses within the space of a single frame (but only one byte per address per frame).

DMX can be used to control a variety of different output functions of a lighting device, for example: to turn a lighting device on or off, to dim the output intensity up or down, to vary the spectrum of the light output, or to change the direction of the lighting device (e.g. to pan and/or tilt the device).

However, DMX is a unidirectional protocol such that, using DMX, the controller 8 can only send data to the lighting devices 10 and cannot not receive any data back from the lighting devices. RDM (Remote Device Management) is a protocol that has been added to the DMX light control protocol in order to enable status feedback (amongst other features). It is used to obtain real-time lamp driver feedback while dynamic scenes are rendered.

As shown in FIG. 3, RDM frames are interleaved with DMX frames by means of time multiplexing. An RDM query cannot be performed over the lighting network 7 at the same time as a DMX frame. Instead, in the space of a DMX frame, the controller 8 transmits an RDM GET or SET command to a lighting device 10 and receives back a corresponding response, all over the same lighting network infrastructure 7 as used for the DMX frames. The RDM traffic is distinguished from the DMX frames by a different start code 23. The RDM SET command allows the controller 8 to configure a lighting device 10 at a certain DMX address and receive an acknowledgement back in response. The acknowledgement from the receiver 10 back to the controller 8 is done within the one DMX frame, so the RDM sent from the controller 8 and the reply are all within the time needed for one single DMX frame. For example an RDM SET command may change the DMX address of the device, change a mode of the device, or invert pan and tilt. The RDM GET command performs a status query directed to a certain RDM address (the UID, a unique ID given at manufacture much like a MAC address), and if a device 10 is present at that address it will return an answer back to the controller 8. The answer from the receiver 10 back to the controller 8 is done within the one DMX frame, so again the RDM sent from the controller 8 and the reply are all within the time needed for one single DMX frame. For example the status query may ask whether a device is present at a certain DMX address, what type of function or device is at a certain address (e.g. a dimmer), what is the current operating temperature of the device, or is there a fault to report.

ArtRDM extends the RDM standard to use over an IP network. RDM SET and GET commands, normally executed over RS-485, are replaced by ArtRDM SET and GET IP packets.

Referring to FIG. 4, in an ArtRDM system the controller 8 is arranged to act as a proxy which receives ArtRDM SET and GET IP packets from an external terminal 2 over an Internet Protocol (IP) network 6. The ArtRDM IP packets are then converted to regular RDM commands at the controller 8, and forwarded onwards in this form over the lighting network 7. The controller 8 also receives back the respective response over the lighting network 7, and then converts this to an IP packet to return to the originating terminal 2 over the IP network 6.

DMX, RDM and ArtRDM can be used in various applications, and are especially useful in real-time applications such as stage lighting where dynamic, real-time changes in the light scene are required. For example, from theatre shows it is well known that dynamic light effects can contribute significantly to the impact of the show. People become exited and experience a more intense atmosphere compared to a situation where only static lighting is used.

SUMMARY

The frame timing is usually fixed. Conventionally, this means that when an RDM query is to be executed (e.g. at the instigation of a user), then in order to accommodate the RDM query, the next DMX frame is dropped immediately after the point in time that the RDM query is received (the current frame is first finished which worst-case takes 23 ms at the typical DMX frame rate of 44 Hz, and then the next DMX frame in the sequence is dropped and replaced by an RDM sequence which takes exactly as long the dropped DMX frame). This sometimes leads to a lower fidelity in dynamic scenes, because the dropped DMX frame will interrupt the smooth flow of the lighting display.

However, it is also recognized herein that, especially in complex lighting systems, users tend only to be interested in the overall status of the lighting system, as opposed to the moment-by-moment detail. E.g. the user may want to know when lamps fail or are about to fail, both during operation and while not in use, but the status information need not be available in real time. Even status information of up to a few minutes old can be quite valuable, for example. On the other hand, as noted above, a DMX command dropped at the wrong time can be disruptive to a dynamic (time-varying) lighting display.

More generally, similar considerations may apply in relation to any type of lighting control protocol and device management protocol, not just DMX and RDM, where the lighting control protocol co-exists with the device management protocol, and where a status query of the device management protocol interrupting the lighting control at the wrong time can have the potential to disrupt the effect of the lighting.

It would be desirable to provide a controller that can automatically interweave status queries of a device management protocol (e.g. RDM queries) into frame sequences of a lighting control protocol (e.g. a sequence of DMX frames) in such a way that dynamic lighting scenes maintain their full fidelity, or at least an acceptable approximation thereof.

According to one aspect disclosed herein, there is provided a controller comprising: a first holding location for storing or buffering two or more lighting control frames of a lighting control protocol (e.g. DMX frames), and a second holding location for storing or buffering at least one status query of a device management protocol (e.g. RDM or ArtRDM). The lighting control commands are stored or buffered in the first holding location in a manner such that they are arranged to be transmitted, by a transmitter, one-after-another in a temporal sequence over a lighting network, in order to control a light emission of at least one lighting device of the lighting network when thus transmitted. The status query is also stored or buffered in a manner so as to be arranged for transmission by the transmitter over the lighting network, in order to query a status of at least one lighting device of the lighting network.

The transmitter may begin transmitting the lighting control frames according to the sequence specified in the first holding location. However, the controller further comprises an arbitrator which is configured to automatically detect when one of the lighting control frames is redundant with respect to another of the lighting control frames within a predetermined number of said frames in said sequence. In response the arbitrator automatically causes the status query to be transmitted in place of the redundant lighting control frame in said sequence.

In embodiments, said predetermined number is one, i.e. the condition for said detection is detecting when one of the lighting control frames is redundant with respect to another, adjacent one of the lighting control frames in said sequence. In embodiments, the condition is that one of the lighting control frames is redundant with respect to the preceding, adjacent lighting control frame in said sequence. Further, in embodiments the condition for redundancy is that said one of the lighting control frames is identical to the preceding adjacent control frame or more generally said other of the lighting control frames.

Preferably, the arbitrator is configured to discard the redundant or identical frame, such that it is not transmitted over the lighting network. Alternatively the redundant or identical frame may be displaced in the sequence (e.g. each frame following the status query is shifted back by one frame).

Thus according to the disclosed techniques, the controller does not necessarily drop or displace a lighting control frame (e.g. DMX frame) as soon as the status query (e.g. RDM query) is received. Rather, it is configured to wait until it identifies where a frame of the lighting control protocol is substantially redundant with respect to another of the lighting control frames being transmitted within a predetermined time window, being redundant at least in that the change in lighting effect between the two frames is negligible to a human observer, and preferably in that the two frames are identical at least in relation to all destination lighting devices that are in use via a given output of the controller 8 (i.e. the redundant frame will not affect the light pattern of any of the connected lamps with respect to the previous frame). E.g. adjacent DMX frames are considered effectively "identical" if for all DMX slots which are being used by all lighting fixtures connected to a given output, the respective byte values do not change from one DMX frame to the next. Note that this does not mean that the entire DMX frame has to be identical. For instance, certain DMX slots may not be in use; and/or, if a controller has multiple outputs (e.g. many controllers have one Ethernet input and many RS-485 outputs) then it can apply the disclosed logic independently to each of its outputs.

Upon identifying a redundant frame, the controller then automatically takes the opportunity to replace the redundant frame with the pending status query. For example, the controller may be configured to identify two identical DMX frames in a row, and to replace the later one by an RDM query.

As a result, lighting effects are not unduly impacted by the use of status checking. Status information may be delayed, but the inventor considers this to be acceptable for various applications.

According to another aspect disclosed herein, there is provided a computer program product comprising code embodied on at least one computer-readable storage medium and configured so as when executed on a lighting controller to perform operations of: storing or buffering two or more lighting control frames of a lighting control protocol for controlling a light emission of at least one lighting device over a lighting network, the lighting control frames being arranged to be transmitted over the lighting network one-after-another in a temporal sequence; receiving at least one status query of a device management protocol for querying a status of at least one lighting device over the lighting network; transmitting ones of the lighting control frames over the lighting network according to said sequence; automatically detecting when one of the lighting control frames is redundant with respect to another of the lighting control frames within a predetermined number of frames in said sequence; and in response to said detection, automatically transmitting the status query in place of the redundant lighting control frame in said sequence.

In embodiments, the computer program product may be further configured to perform operations in accordance with any of the controller features disclosed herein.

According to yet another aspect disclosed herein, there is provided a method comprising: storing or buffering two or more lighting control frames of a lighting control protocol for controlling a light emission of at least one lighting device over a lighting network, the lighting control frames being arranged to be transmitted over the lighting network one-after-another in a temporal sequence; receiving at least one status query of a device management protocol for querying a status of at least one lighting device over the lighting network; transmitting ones of the lighting control frames over the lighting network according to said sequence; automatically detecting when one of the lighting control frames is redundant with respect to another of the lighting control frames within a predetermined number of frames in said sequence; and in response to said detection, automatically transmitting the status query in place of the redundant lighting control frame in said sequence.

In embodiments, the method may further comprise operations in accordance with any of the controller features disclosed herein.

BRIEF DESCRIPTION OF THE DRAWINGS

For a better understanding of the present disclosure and to show how embodiments may be put into effect, reference is made by way of example to the accompanying drawings in which.

DETAILED DESCRIPTION OF EMBODIMENTS

Figure 4:
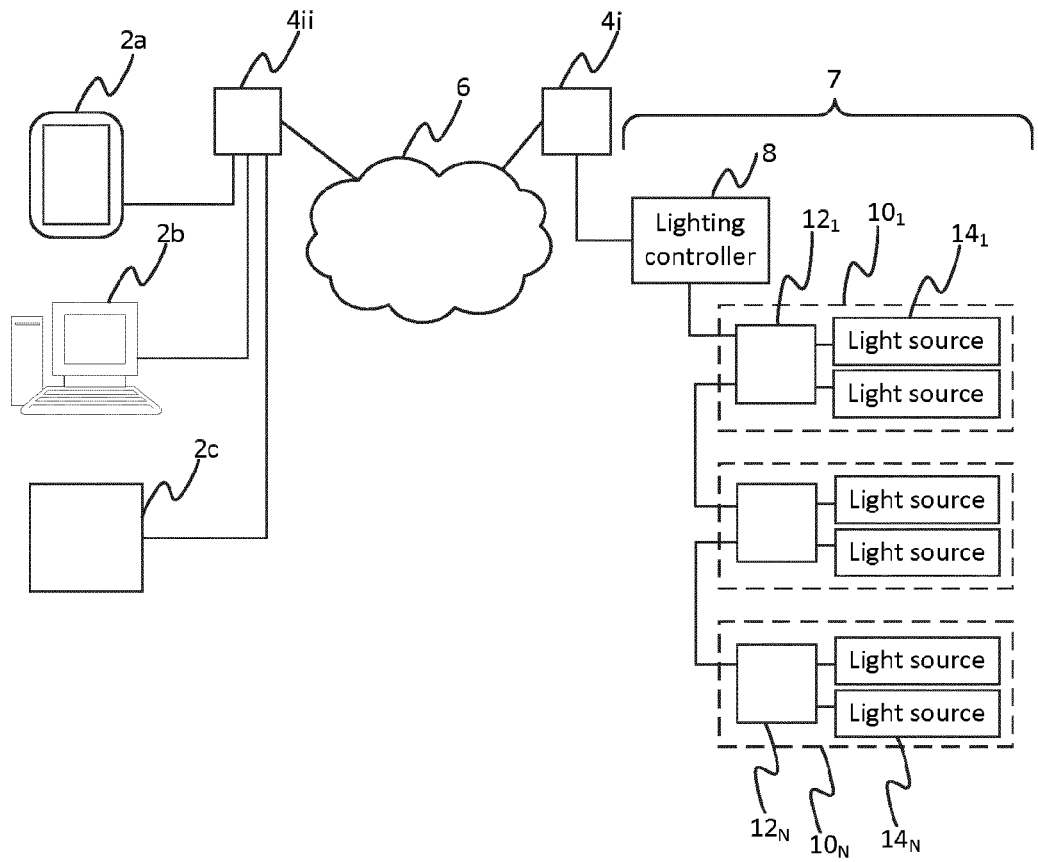
FIG. 4 is a schematic block diagram of a lighting system.

FIG. 4 illustrates an example lighting system in which embodiments of the present disclosure may be implemented. The system comprises at least a lighting network 7, comprising a lighting controller 8 and one or more lighting devices 10 ($10_1$ to $10_N$) connected together by a suitable bus or interconnect infrastructure in order to form the lighting network 7. Each lighting device 10 ($10_1$ to $10_N$) comprises one or more light sources 14 ($14_1$ to $14_N$), e.g. one or more LED lamps, incandescent lamps and/or gas discharge lamps; and a respective base unit 12 ($12_1$ to $12_N$) connecting the one or more light sources 14 of the respective lighting device 10 to the network.

Figure 1:
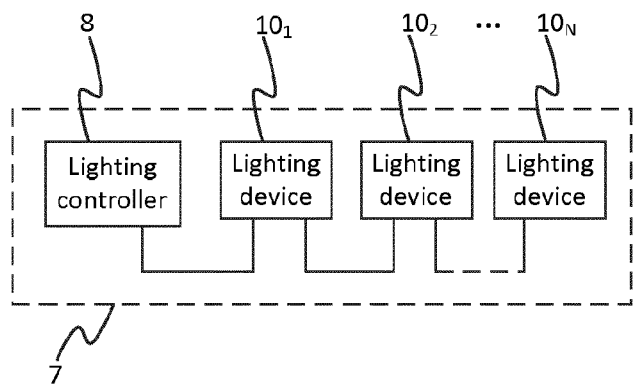
FIG. 1 is a schematic block diagram of a lighting network.
Figure 2:
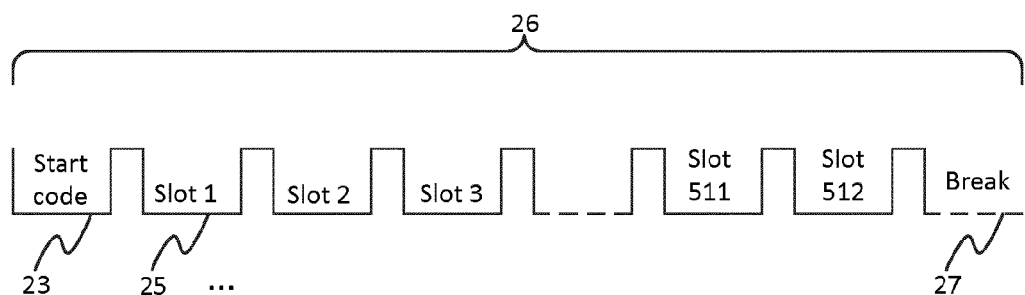
FIG. 2 is a schematic representation of a DMX frame,
FIG. 3 schematically illustrates an RDM query interleaved between DMX frames.

The lighting controller 8 is configured to send frames of a lighting control protocol, such as DMX, over the lighting network 7 and therefore onwards to at least one of the lighting devices 10. For example in DMX/RS-485 all slave devices 10 receive the DMX signal from the controller 8 via the lighting network 7, and a DMX frame 26 transmitted over the lighting network 7 will act on any address corresponding to a time slot 25 which is being used to transmit data in that frame (see again FIG. 2). The lighting control protocol may be used, for instance, to turn a lighting device or individual light source 14 on or off, dim the output intensity of a lighting device 10 or individual light source 14 up or down, adjust the spectrum of a lighting device or individual light source 14 (e.g. adjust a hue value or RGB values), or change the direction or spatial distribution of a lighting device or individual light source 14 (e.g. to pan or tilt a movable lighting device 10 or source 14). In the case where a lighting device 10 is assigned multiple addresses of the lighting control protocol (e.g. multiple DMX addresses), each address may control a different constituent light source 14, or a different function of the lighting device 10 (e.g. switching, dimming, color control and/or direction), or a different combination of light source 14 and function.

The lighting control protocol may be a unidirectional protocol such as DMX, which is incapable of itself querying the status of any of the lighting devices 10 on the lighting network 10. Hence to supplement the lighting control protocol, the lighting controller 8 is also configured to use a distinct, bidirectional device management protocol such as RDM on top of the lighting control protocol. Accordingly, the controller 8 is configured to send status queries 28 of the device management protocol. For example, the controller 8 sends an RDM GET command over the lighting network 7 to an RDM address (UID) one of the lighting devices 10 (or an individual light source 14 and/or function of the lighting device 10), and the addressed device responds back with the requested status information within the period of one DMX frame. The status queries of the device management protocol may be used, for instance, to request information from a sensor of the lighting device (e.g. a temperature sensor to measure a current operating temperature of the lighting device 10 or an individual light source), or to query a count of a number of operating hours of a lighting device 10 or individual light source 14, or to query a number of lamp strikes of a light source 14, or to request a fault report for a lighting device 10 or individual light source 14.

Note that in embodiments, the device management protocol may also have the ability to configure settings of the lighting devices 10 over the lighting network 7. For example, the controller 8 sends an RDM SET command over the lighting network 7 to an addressed one of the lighting devices 10, and the addressed lighting device adjusts the configured setting accordingly and responds back with an acknowledgement within the period of one DMX frame. The configuration commands of the device management may be used, for instance, to change the address of a lighting device 10 or individual light source 14 on the network 7, to change a mode of a lighting device 10, or invert pan and tilt.

In embodiments, the frame sequences of the lighting control protocol and/or the status queries are generated at the controller 8 (e.g. in response to one or more user inputs of the controller 8) or are input directly to the controller 8 (e.g. from an external device connected directly to the controller 8). Alternatively or additionally, the controller 8 may be configured to act as a proxy for receiving the frames of the lighting control protocol and/or the status queries remotely over a communication network 6 (separate from the lighting network 7), or for generating the frames and/or status queries in response to corresponding messages received over the communication network 6. In embodiments the communication network 6 is a packet-switched network, such as an IP network.

In the case where the controller 8 is arranged as a proxy, the controller 8 is connected to the communication network 6 via a first wired or wireless connection point 4*i*, e.g. an Ethernet switch or a wireless access point such as a Wi-Fi or ZigBee access point. Further, at least one external networked device 2 is connected to the communication network 6 via a second wired or wireless access point 4*ii*, e.g. again an Ethernet switch or a wireless access point such as a Wi-Fi or ZigBee access point. The external networked device 2 may take the form of a user terminal such as a tablet 2*a*, a desktop or laptop computer 2*b*, or a dedicated lighting or stage-management console 2c, through which the user can instigate the lighting control sequences and/or status queries, and view responses to any status queries. Alternatively the external networked device 2 may be another type of device such as a server for automatically generating a lighting control sequence, or retrieving a pre-programmed sequence from memory.

Either way, the external networked device 2 transmits the lighting control frames (e.g. DMX frames) and/or status queries (e.g. RDM queries) to the lighting controller 8 via the connection points 4 and communication network 6 (e.g. in the payload one or more packets such as IP packets in the case of a packet-switched network). Alternatively the external networked device 2 may transmit corresponding messages which the controller 8 is able to interpret in order to generate the desired control frames and/or status queries at the controller side 8 (e.g. these messages being sent in the payload of one or more packets such as IP packets). In the case of a status query, the controller 8 also returns the response (e.g. RDM response) or a corresponding message back to the external networked device 2 via the connection points 4 and communication network 6 (e.g. again in the payload of one or more packets such as IP packets).

For example, in an ArtRDM system the controller 8 receives ArtRDM SET and GET IP packets from an external terminal 2 over an Internet Protocol (IP) network 6. The ArtRDM IP packets are then converted to regular RDM commands at the controller 8, and forwarded onwards in this form over the lighting network 7 to the target lighting device 10 (this may only require a small amount of conversion if the RDM command is included more-or-less verbatim in the payload of the ArtRDM packet and only requires extracting from the packet). In response, the controller 8 receives back the reply from the target device 10 over the lighting network 7, and then converts this to an IP packet to return to the originating terminal 2 over the IP network 6.

The following will be described in terms of DMX and RDM or ArtRDM, but it will be appreciated that more generally the disclosed techniques can be applied in relation to any lighting control protocol and/or any device management protocol instead of DMX and/or RDM or ArtRDM respectively.

Figure 5:
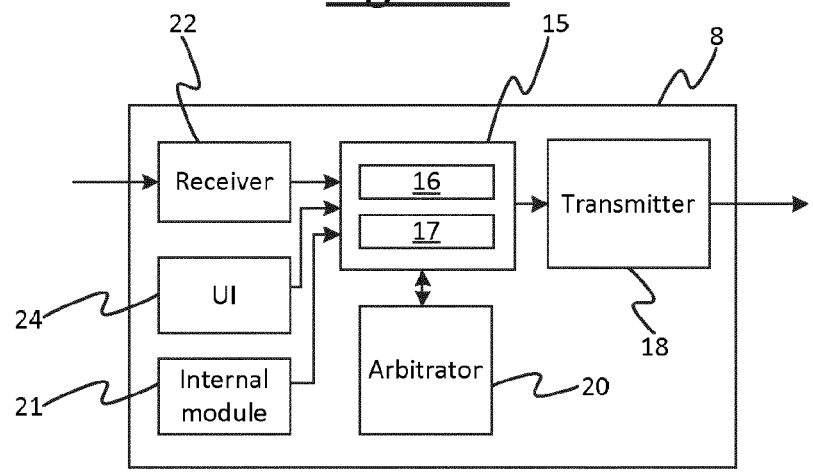
FIG. 5 is a schematic block diagram of a controller of a lighting system, and
FIG. 6 schematically illustrates an arbitration scheme for RDM and DMX.

FIG. 5 illustrates an example controller 8 in accordance with embodiments disclosed herein. The controller 8 comprises a transmitter 18 configured to transmit the DMX frames and RDM query to the relevant address or addresses of the DMX network 7, and therefore to the respective one or more target lighting devices 10 to which those addresses are assigned (or individual functions or light sources 14 of such devices 10). When transmitting a DMX frame 26, which comprises a time-slot 25 for each possible address and therefore potentially contains data for every address (see again FIG. 2), the transmitter 18 sends the DMX frame over the lighting network 7 to the base unit $12_1 \ldots 12_N$ of each of the lighting devices $10_1 \ldots 10_N$ respectively. When transmitting an RDM status query (GET) command on the other hand, the command is directed to a specific RDM address (UID). While the RDM command use a different addressing scheme than the DMX protocol, the RDM commands and responses may be sent over the same lighting network infrastructure 7. The controller 8 further comprises a holding means 15 in the form of one or more memory devices and/or buffers. This holding means comprises a first holding location 16 for holding a sequence of two or more DMX frames to be transmitted over the lighting network 7, and a second holding location 17 for holding one or more RDM status queries to be transmitted over the lighting network 7.

The first holding location 16 may comprise a memory or region of memory for storing the sequence of DMX frames, or a buffer (e.g. FIFO) for buffering the sequence. Either way, the sequence of DMX frames is arranged in the memory or buffer 16 ready to be transmitted from the transmitter 18 over the lighting network 7 to the one or more destination lighting devices 10, with each DMX frame being transmitted in turn in a different successive time period according to the specified sequence. Note that the sequence as stored or buffered in the first holding location is not necessarily all the DMX frames that are to be transmitted, and may form only a part of a greater sequence. Also, in the case of a buffer, the frames of the sequence may be queued in the buffer, or each frame could pass individually one-by-one through the buffer (though in the latter case the controller 8 would need to retain at least a temporary record somewhere of at least one other transmitted frame, e.g. in an operand register, as will become apparent shortly).

The first holding location 16 may be arranged to receive the sequence of DMX frames from a number of possible sources. In embodiments, the controller 8 comprises a receiver 22 for receiving the DMX sequence from an external device. For example the receiver 22 may comprise a port for receiving the sequence over a local wired connection, e.g. from an external lighting desk connected to the controller 8; or as another example, the receiver 22 may comprise a wireless receiver for receiving the sequence over a local wireless connection such as a Bluetooth connection, e.g. from a locally connected mobile device. Alternatively, the receiver 22 may comprise a network interface for receiving the DMX sequence over a communication network 6 such as an IP network or other packet-switched network; or for receiving one or more messages over the communication network 6 which software or hardware of the network interface 22 can interpret in order to generate a requested sequence of DMX frames at the controller 8. For example, the DMX sequence may be sent or instructed from a remote user terminal 2 such as a tablet 2a, desktop or laptop computer 2b, or lighting desk 2c connected to the network 6, instigated through the remote user terminal 2 by a remote user; or as another example the sequence may be sent or instructed from another remote networked device such as a server. In another alternative, the controller comprises a user interface 24 (e.g. physical sliders, knobs and/or buttons, or a graphical interface such as a touch screen) through which the user can instigate a lighting sequence by means of one or more user inputs. In response, software or hardware of the user interface 24 then generates the sequence of DMX frames corresponding to the one or more user inputs. In yet another alternative, the DMX sequence may be provided by an internal module 21 of the controller 8, e.g. an application running on the controller 8.

Further, the sequence of DMX frames may be pre-programmed via the receiver 22 or user interface 24; or may be received live, e.g. streamed from an external device or generated in response to live user inputs. Further, note that all the DMX commands of the sequence do not necessarily have to originate from the same source, or be received in the same manner.

Turning to the second holding location 17, this may comprise a memory or region of memory for storing the one or more RDM queries (GET command), or a buffer for buffering the one or more RDM queries. Either way, the one or more RDM queries are held in the memory or buffer 17 to be transmitted from the transmitter 18 over the lighting network 7 to the respective destination lighting device 10. Note that the second holding location 17 may be implemented in the same memory device or same buffer device as the first holding location 16, or in a different memory device or buffer device.

The second holding location 17 may be arranged to receive the one or more RDM queries from a number of sources, and from either the same or a different source than the sequence of DMX frames. In embodiments, the receiver 22 may receive the one or more RDM queries from an external device. For example the receiver 22 may comprise a port for receiving the one or more queries over a local wired connection, e.g. from an external lighting desk connected to the controller 8; or as another example, the receiver may comprise a wireless receiver for receiving the one or more queries over a local wireless connection such as a Bluetooth connection, e.g. from a locally connected mobile device. Alternatively, the receiver 22 may comprise a network interface for receiving the one or more RDM queries over a communication network 6 such as an IP network or other packet-switched network; or for receiving one or more messages over the communication network 6 which software or hardware of the network interface 22 can interpret in order to generate a requested RDM query at the controller 8. For example, the one or more RDM queries may be sent or instructed from a remote user terminal 2 such as a tablet 2a, desktop or laptop computer 2b, or lighting desk 2c connected to the network 6, instigated through the remote user terminal 2 by remote user; or as another example the one or more queries may be sent or instructed from another remote networked device such as a server. In another alternative, the controller comprises a user interface 24 (e.g. physical buttons, or a graphical interface such as a touch screen) through which the user can instigate one or more status query by means of one or more user inputs. In response, software or hardware of the user interface 24 then generates the one or more RDM queries corresponding to the one or more user inputs. In yet another alternative, the one or more RDM queries may be provided by an internal module 21 of the controller 8, e.g. an application running on the controller 8.

Further, the one or more RDM queries may be pre-programmed via the receiver 22 or user interface 24; or may be received live, e.g. as part of a stream from an external device or generated in response to live user inputs. Further, note that where there are multiple RDM queries, they do not all necessarily have to originate from the same source, or be received in the same manner.

By whatever means the DMX sequence and one or more RDM queries are received, the transmitter 18 is arranged to transmit ones of the DMX frames in the specified sequence, in the manner as described above. The sequence controls the lighting dynamically to produce a dynamic (time-varying) lighting effect, based on the data addressed to the one or more lighting devices 10 (or their constituent light sources 14 and/or functions) in the time slots 25 of the DMX frames 26 of the sequence.

Figure 3:
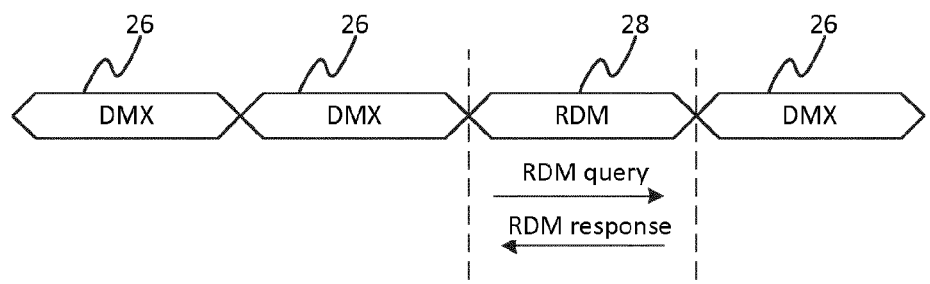

However, if an RDM query 28 arrives during the ongoing dynamic lighting sequence, then the transmitter 18 cannot transmit both a DMX frame 26 and the RDM query at the same time. This means either dropping or delaying a DMX frame to accommodate the RDM query in a time multiplexed manner (see again FIG. 3). Conventionally the next DMX frame is dropped as soon as the RDM query is ready to be sent. However, this can cause a noticeable disruption to a dynamic light scene. The disruption may not be large, but may nonetheless be perceivable to a human observer as a strange glitch or artefact.

For example, say the dynamic light scene is currently being produced by a pre-programmed sequence of DMX frames being read out of an internal memory of the controller 8 (e.g. memory 17, or another internal storage if the first holding location 17 represents a buffer). Or as another example, the dynamic light scene is being produced by a sequence of DMX frames being automatically streamed to the controller 8 from an external device (e.g. one of the networked devices 2, or a local external device), having been pre-programmed at the external device. While the dynamic light scene is going on, a user then instigates an RDM status query via the user interface 24 of the controller 8 or from a networked or local external user terminal (e.g. 2a, 2b, 2c)—without thinking about the potential disruption to the dynamic light scene. Or perhaps the RDM query was also pre-programmed to occur at this time, but the programmer did not consider the potential disruption this could cause.

To eliminate or at least reduce the impact of such scenarios, according to embodiments disclosed herein the controller 8 is provided with an arbitrator 20. The arbitrator 20 is operably coupled to the holding means 15 so as to be able to observe the sequence of DMX frames in the first holding location 16. The arbitrator 20 may be implemented in software stored on one or more memories of the controller 8 and arranged for execution on one or more processors of the controller 8. Alternatively, it is not excluded that some or all of the arbitrator 20 could be implemented in dedicated hardware circuitry, or configurable or reconfigurable hardware circuitry such as a PGA or FPGA.

Figure 6:
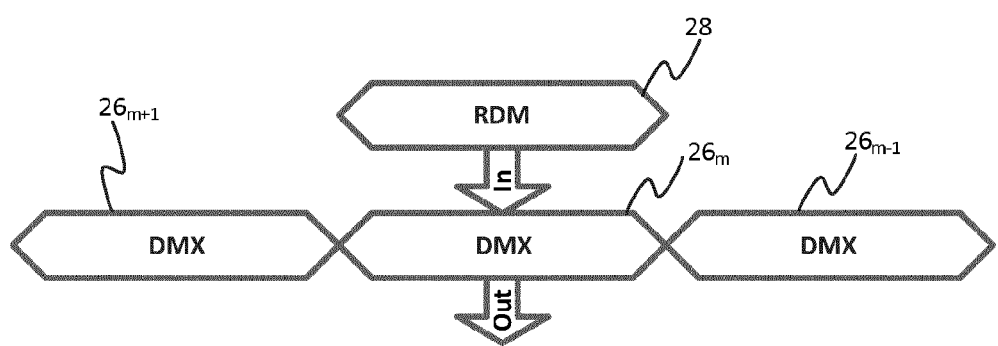

Referring to FIG. 6, the arbitrator 20 is configured to delay sending the RDM query 28 over the lighting network 7, such that it is not transmitted as soon as it is received or generated. Rather, the arbitrator is configured to parse and interpret the DMX frames 26 about to be send to the lighting drivers of the one or more lighting devices 10, and to wait until it detects two DMX frames 26 in series of which the DMX address slots 25 of the lighting devices 10 in its universe output are identical (and hence the later of the two frames will not affect the light pattern of any of the connected lamps 10 with respect to the previous frame).

In virtually all dynamic scenes there will always be such occasions, especially if only eight devices 10 are connected to one output. DMX is a streaming protocol with a fixed frame (sample) rate. As such, a controller 8 is nearly always generating redundant information because the defined way to control a lighting device 10 to be OFF is to instruct it OFF-OFF-OFF . . . 44 times per second throughout the duration for which it is intended to be off, and the defined way to control a lighting device 10 to be ON is to instruct it ON-ON-ON . . . 44 times per second throughout the duration it is to be turned on (or similarly to control the lighting device 10 to stay at a certain dimming level or color, the protocol is to continue to send the same dimming level or color value 44 times per second, etc.). However, if a lighting device misses one of those 44 commands, nothing wrong happens. Most DMX lamps go into "FAIL" mode if they do not detect receipt any DMX frames, but only after not detecting a DMX frame for a certain timeout window that is much longer than the (1/44)s period of a single DMX frame, e.g. 1.5 seconds. As an example, if the controller 10 does not tell a lighting device OFF-OFF-OFF . . . 44 times per second for 1.5 seconds (so 66 missing DMX frames), it will default to FAIL mode which is often ON (depends on the application). In dynamic sequences it is very rare that the light levels change every 1/44 second. Even a fast strobe of 11 Hz has two identical frames ON and two identical frames OFF. Therefore, there will often be redundant frames that can be dropped without causing any actual effect, as long as fewer than 66 frames are dropped (or whatever number would cause a lighting device 10 to default to fail mode).

Whenever a DMX frame $26_m$ is identical to the previous frame $26_{m-1}$ in terms of the values of the DMX slots 25 of the connected lighting devices 10, then the arbitrator 20 drops the DMX frame $26_m$ and interweaves an RDM query 28 (assuming there is one pending). Because there are no harsh requirements on RDM latency, it is no problem if the RDM query is delayed up to a few minutes. Thus status information can be made available a RDM/DMX system without unduly compromising the fidelity of dynamic scenes.

Note that frames 26 are considered "identical" herein if at least the slots 25 corresponding to all the lighting devices 10 being used in the system are identical. It does not matter if unused slots are not identical. While this is the preferred condition, more generally the condition may be loosened without too much detriment to the light scene. For example, two frames 26 could be considered sufficiently similar to drop one of them if the data values in the used slots 25 of one frame 26 are similar enough to their respective data values of the other frame 26 within a predetermined threshold range for each slot. Further, the condition does not necessarily have to be that the frame $26_m$ being dropped is identical or similar to the preceding frame $26_{m-1}$. More generally, it could be dropped if identical or sufficiently similar to another frame within a predetermined time window, e.g. within the previous two or three frames; or a frame $26_m$ could be dropped if it is identical or sufficiently similar to the next frame $26_{m+1}$ about to be transmitted.

Furthermore, it is not necessary in all possible embodiments that the DMX frame in question is dropped (discarded, i.e. not transmitted). Alternatively the arbitrator 20 could cause the entire remaining sequence of frames 26 to be shifted back one frame later. However, that may be less preferred as it will cause a short lag in the lighting display.

Note also that for device management protocols like RDM, the controller 8 may also be able to send configuration commands (e.g. RDM SET commands) over the lighting network 7. In embodiments, the arbitrator 20 is configured to only perform the above process for status queries and not for configuration commands, i.e. a DMX frame will not be dropped to accommodate a configuration command. Alternatively, the process may be applied for both status queries and configuration commands (e.g. both RDM SET and GET commands). I.e. the arbitrator 20 is configured such that both: when a status query is received it will wait until it detects a redundant DMX frame and then drop or displace that frame to accommodate the status query, and when a configuration command is received it will also wait until it detects a redundant DMX frame and then drop or displace that frame to accommodate the configuration command.

It will be appreciated that the above embodiments have been described only by way of example. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A controller comprising:
 a first holding location for storing or buffering two or more lighting control frames of a lighting control protocol, so as to be arranged for transmission by a transmitter one-after-another in a temporal sequence over a lighting network, in order to control a light emission of at least one lighting device of the lighting network;
 a second holding location for storing or buffering at least one status query of a device management protocol, so as to be arranged for transmission by the transmitter over the lighting network in order to query a status of at least one lighting device of the lighting network;
 an arbitrator configured to automatically detect when one of the lighting control frames is redundant with respect to another of the lighting control frames within a predetermined number of said frames in said sequence, and in response to automatically cause the status query to be transmitted in place of the redundant lighting control frame in said sequence.

2. The controller of claim 1, wherein the arbitrator is configured to perform said detection by detecting when one of the lighting control frames is redundant with respect to another, adjacent one of the lighting control frames in said sequence.

3. The controller of claim 2, wherein the arbitrator is configured to perform said detection by detecting when one of the lighting control frames is redundant with respect to the preceding, adjacent lighting control frame in said sequence.

4. The controller of claim 1, wherein the arbitrator is configured to detect said redundancy by detecting when one of the lighting control frames is identical to said preceding adjacent lighting control frame or said other of the lighting control frames.

5. The controller of any of claim 1, wherein the arbitrator is configured to discard the redundant or identical frame, such that it is not transmitted over the lighting network.

6. The controller of claim 1, comprising a receiver for receiving the lighting control frames and/or status query from an external source; the first holding location and/or second holding location, respectively, being arranged to receive the lighting control frames and/or status query from the receiver.

7. The controller of claim 6, wherein the receiver comprises network interface configured to receive the lighting control frames and/or status query over a communication network, or to generate the lighting control frames and/or status queries in response to corresponding messages received over the network; the first holding location and/or second holding location, respectively, being arranged to receive the lighting control frames and/or status query from the network interface.

8. The controller of claim 1, comprising a user interface configured to generate the lighting control frames and/or status query at the instigation of a user; the first holding location and/or second holding location, respectively, being arranged to receive the lighting control frames and/or status query from the user interface.

9. The controller of claim 1, wherein the lighting control protocol is unidirectional and cannot query status information from the lighting equipment, while the device management protocol is bidirectional for receiving back responses to the status queries via the lighting network.

10. The controller of claim 1, wherein the lighting control protocol is DMX, the lighting control frames being DMX frames.

11. The controller of claim 1, wherein the device management protocol is RDM or ArtRDM, the at least one status query being a RDM status query.

12. A computer program product comprising code embodied on at least one computer-readable storage medium and configured so as when executed on a lighting controller to perform operations of:
   storing or buffering two or more lighting control frames of a lighting control protocol for controlling a light emission of at least one lighting device over a lighting network, the lighting control frames being arranged to be transmitted over the lighting network one-after-another in a temporal sequence;
   receiving at least one status query of a device management protocol for querying a status of at least one lighting device over the lighting network;
   transmitting ones of the lighting control frames over the lighting network according to said sequence;
   automatically detecting when one of the lighting control frames is redundant with respect to another of the lighting control frames within a predetermined number of frames in said sequence; and
   in response to said detection, automatically transmitting the status query in place of the redundant lighting control frame in said sequence.

13. A method comprising:
   storing or buffering two or more lighting control frames of a lighting control protocol for controlling a light emission of at least one lighting device over a lighting network, the lighting control frames being arranged to be transmitted over the lighting network one-after-another in a temporal sequence;
   receiving at least one status query of a device management protocol for querying a status of at least one lighting device over the lighting network;
   transmitting ones of the lighting control frames over the lighting network according to said sequence;
   automatically detecting when one of the lighting control frames is redundant with respect to another of the lighting control frames within a predetermined number of frames in said sequence; and
   in response to said detection, automatically transmitting the status query in place of the redundant lighting control frame in said sequence.

14. The method of claim 13, wherein said detection comprises detecting when one of the lighting control frames is redundant with respect to another, adjacent one of the lighting control frames in said sequence.

15. The method of claim 13, comprising discarding the redundant frame, such that it is not transmitted over the lighting network.

* * * * *